United States Patent [19]

Hazlett et al.

[11] Patent Number: 4,844,163
[45] Date of Patent: Jul. 4, 1989

[54] IN-SITU FOAMING OF POLYMER PROFILE CONTROL GELS

[75] Inventors: Randy D. Hazlett; E. Thomas Strom, both of Dallas, Tex.

[73] Assignee: Mobil Oil Corporation, New York, N.Y.

[21] Appl. No.: 139,214

[22] Filed: Dec. 29, 1987

[51] Int. Cl.⁴ .................... E21B 33/138; E21B 43/22
[52] U.S. Cl. .................................. 166/270; 166/274; 166/295; 166/300
[58] Field of Search ........... 166/270, 273, 274, 292, 166/294, 295, 300, 309; 106/87

[56] References Cited

U.S. PATENT DOCUMENTS

| | | | |
|---|---|---|---|
| 2,761,511 | 9/1956 | Billue | 166/292 |
| 3,993,133 | 11/1976 | Clampitt | 166/270 X |
| 4,232,741 | 11/1980 | Richardson et al. | 166/292 X |
| 4,300,634 | 11/1981 | Clampitt | 166/272 |
| 4,450,010 | 5/1984 | Burkhalter et al. | 106/87 |
| 4,676,318 | 6/1987 | Myers et al. | 166/293 |
| 4,694,906 | 9/1987 | Hutchins et al. | 166/274 X |
| 4,703,797 | 11/1987 | Djabbarah | 166/294 X |
| 4,705,810 | 11/1987 | Millet et al. | 521/92 X |

Primary Examiner—George A. Suchfield
Attorney, Agent, or Firm—Alexander J. McKillop; Charles J. Speciale; Charles A. Malone

[57] ABSTRACT

A chemical blowing agent is incorporated into a polymer formulation to provide delayed foaming in a subterranean reservoir when, via catalysis through reservoir temperature or minerals present, the reservoir itself initiates or accelerates decomposition of the chemical. The resultant gelled foam expands and stiffens thereby closing pores in a more permeable zone of said reservoir. Once foaming is completed, a carbon-dioxide or water-flooding oil recovery process can be used to recover hydrocarbonaceous fluids from a zone of lesser permeability.

31 Claims, 1 Drawing Sheet

IN-SITU FOAMING OF POLYMER PROFILE CONTROL GELS

FIELD OF THE INVENTION

This invention is directed to an enhanced oil recovery method where an in-situ foamed polymer gel is used for profile control.

BACKGROUND OF THE INVENTION

In the recovery of oil from oil-containing formations, it usually is possible to recover only minor portions of the original oil-in-place by the so-called primary recovery method which utilizes only the natural forces present in the formation. Thus, a variety of supplemental recovery techniques have been employed in order to increase the recovery of oil from subterranean formations. The techniques include waterflooding, miscible flooding, and thermal recovery methods.

A problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to plug the high permeability zones wholly or partly and so divert the displacing fluid into the low permeability zones. Mechanical isolation of the thief zones has been tried, but vertical communication among reservoir strata often renders such measures ineffective. Physical plugging of the high permeability zones by cements and solid slurries has also been attempted with varying degrees of success, but here the most serious drawback is the possibility of permanently closing still productive horizons.

From these early experiences, the desirability of designing a viscous slug capable of sealing off the most permeable layers so that the floodwater would be diverted to the underswept, tighter regions of the reservoir, became evident. This led to the use of various materials for controlling the permeability of the formations in a process frequently referred to as "profile control", a reference to the control of the vertical permeability profile of the reservoir. Profile control agents which have been proposed have included oil/water emulsions, gels, e.g., lignosulfonate gels and polymers, with polymers being the most extensively applied in recent years.

Among the polymers so far examined for improving waterflood conformance are polyacrylamides, polysaccharides, celluloses, furfural-alcohol and acrylic/epoxy resins, silicates and polyisocyanurates. A major part of this work has been conducted with the polyacrylamides. Polyacrylamides have been used both in their normal, noncrosslinked form as well as in the form of cross-linked metal complexes, as described, for example, in U.S. Pat. Nos. 4,009,755; 4,069,869 and 4,413,680. In either form the beneficial effects derived from these polyacrylamides seem to dissipate rapidly due to shear degradation during injection and sensitivity to reservoir brines.

Another group of polymeric thickeners which has received considerable attention for use in waterflooding is the polysaccharides, particularly the xanthan polysaccharides, that is, the polysaccharides produced by the action of bacteria of the genus Xanthomonas on carbohydrates. For example, U.S. Pat. Nos. 3,757,863 and 3,383,307 disclose mobility control by the use of polysaccharides in the presence of polyvalent metal ion crosslinking agents. U.S. Pat. No. 3,810,882 discloses the possibility of using certain reducible complex metal ions as cross-linking agents for polysaccharides. U.S. Pat. Nos. 4,078,607 and 4,104,193 describe a method for improving the efficiency of waterflooding operations by a particular polysaccharide prehydration technique. U.S. Pat. No. 4,413,680 describes the use of cross-linked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations. The use of polyvalent metal ions for cross-linking polysaccharides and other polymers which are to be used for permeability control is described in U.S. Pat. Nos. 4,009,755, 4,069,869 and 4,413,680.

The use of either organic or inorganic polymers in the gel form is especially desirable for profile control because the polymer is a relatively minor constituent of the gel, with water filling the majority of the pore space in the formation. The range of polymer concentration needed to form a stable gel can be as low as 0.2% for a chromium cross-linked biopolymer to 4–10% for polyacrylamides cross-linked with methylene-bisacrylamide. Therefore, what is needed is a method which can further decrease the amount of polymer utilized in a profile control treatment that would make profile control treatments still more effective and economical.

SUMMARY

In the practice of this invention a gas generating agent, a surfactant, and polyacrylamide/methylene-bisacrylamide polymer or other profile control polymer are placed in an aqueous solution of controlled pH. These components are placed in said solution in an amount sufficient to make a foamable gel. Thereafter, said solution is injected into a formation containing permeability variation. Said solution preferentially enters a zone of greater permeability where a gellable foam is formed by gases evolving from said gas generating agent thereby expanding the resulting gel.

Subsequently, the foam gel stiffens and closes the pores in the zone of greater permeability. After blocking the more permeable zone of the formation, a $CO_2$ flood or waterflood is commenced in a zone of lesser permeability, thereby removing hydrocarbonaceous fluids therefrom.

It is therefore an object of this invention to form a foamed gel in-situ.

It is another object of this invention to increase the effectiveness of a gel during profile control while reducing the amount of gel utilized.

DESCRIPTION OF THE PREFERRED EMBODIMENT

Figure 1:
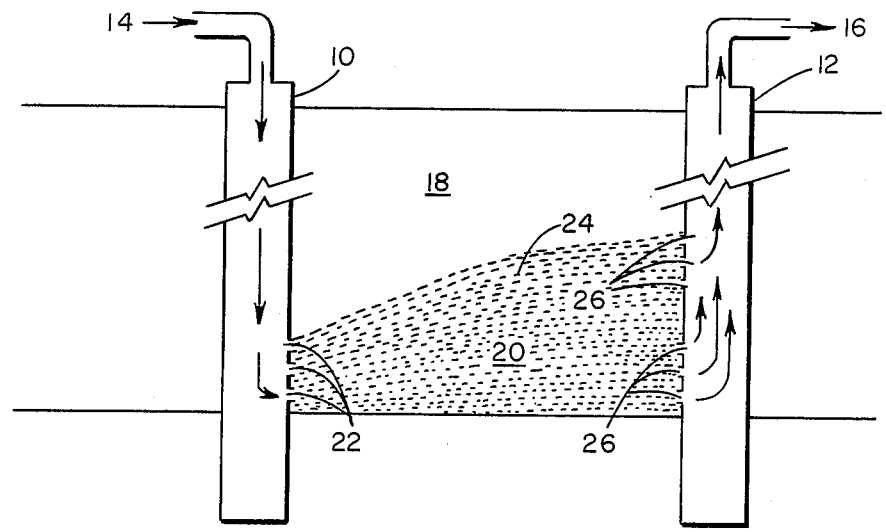
FIG. 1 is a schematic illustration showing swept and unswept zones of a formation penetrated by injection and production during a miscible gas flood.

In the practice of this invention a saline solution having a pH of about 8 is prepared. The saline solution which is utilized may comprise formation brine, brackish water, sea water, or water having a similar salt concentration. This saline solution may contain, for example, up to 3% KCl, up to 25% of NaCl or up to 20% $CaCl_2$. To adjust the pH to the desired level either sodium or potassium hydroxide may be utilized, or the solution may be buffered.

Into this saline solution is placed a polyacrylamide/methylene-bis-acrylamide polymer in an amount sufficient to make a foamable gel. The amount of polyacrylamide contained in the solution will vary from about 3 to about 15 percent by weight, preferably about 4 to about 10 percent. Methylene-bis-acrylamide in the solution varies from about 0.04 percent by weight to about 4 percent, preferably about 0.2 to about 0.4 percent. Gels formed from this composition can be generated in a formation by initiating free radical polymerization in-situ using typical initiators such as peroxides or azo compounds that decompose at reservoir temperatures. The use of activators such as alkanol amines can further reduce the temperature needed for free radical initiation. The time of foaming and the time of gel formation can be tailored to each other by using initiators that are active at different temperatures, or by incorporating therein free radical retarders such as potassium ferricyanide. These initiators are used in an amount sufficient to obtain foaming and gel formation within a desired time. Initiators which are active at different temperatures include sodium persulfate, t-butylhydroperoxide and cumyl hydroperoxide.

Once the polymers have been mixed into the saline solution, a foaming agent and a surfactant are added. A gas generating agent which can be used is dinitrosopentamethylenetetramine (DNPT). This, gas generating agent is marketed by Olin as OPEX 100 and decomposes to yield nitrogen, ammonia, and formaldehyde. Concentrations of DNPT above about 1% by weight are obtainable in warm aqueous solutions. Too high a concentration of blowing agent will lead to increasing interconnectivity of gas, eventually leading to sponge-like material. Open cell networks will result in lower flow diversion capability of the treatment. At standard temperature and pressure this limit usually lies between about 2 to 5% by weight. At typical reservoir conditions, polymer gel expansion will be limited by the solubility limit of the gas generating agent if single phase injection is desired. A colloidal suspension, however, can be employed to yield expansion factors significantly higher than those limited by solubility considerations. One surfactant which can be utilized herein is sodium dodecyl benzene sulfonate. Said surfactant is incorporated into said solution in about 0.1% to about 2% percent by weight. A surfactant serves to stabilize the foam prior to significant viscosity buildup and promotes a fine textured foam in the formation. In the case of injected dispersions, the surfactant also inhibits flocculation.

Other foam-forming surfactants suitable for use in the present invention can comprise substantially any which are capable of being dissolved or dispersed in an aqueous liquid solution containing the nitrogen containing compound and which remain substantially inert during the nitrogen-gas-producing reaction of the nitrogen containing compounds. Examples of suitable surfactants comprise nonionic and anionic surfactants, commercially available sodium dodecylbenzene sulfonates, e.g., Siponate DS-10 available from American Alcolac Company, mixtures of the Siponate or similar sulfonate surfactants with sulfated polyoxyalkylated alcohol surfactants, e.g., the NEODOL sulfate surfactants available from Shell Chemical Company; sulfonate-sulfate surfactant mixtures, e.g., those described in the J. Reisberg, G. Smith and J. P. Lawson U.S. Pat. No. 3,508,612; petroleum sulfonates available from Bray Chemical Company; Bryton sulfonates available from Bryton Chemical Company; Petronates TM and Pyronates TM, water-soluble petroleum sulfonates, available from Sonnoborn Division of Witco Chemical Company; fatty acid and tall oil acid soaps, e.g., Actynol Heads from Arizona Chemical Company; nonionic surfactants, e.g., Iriton X100; and the like surfactant materials which are soluble or dispersible in aqueous liquids. These surfactants are disclosed in U.S. Pat. No. Re. 30,935 which issued to Richardson et al. on May 18, 1982. This patent is incorporated herein by reference.

Other foaming agents which can be utilized herein include blends of sodium hydrogen carbonate and nitrogen releasing agents such as p-toluene sulfonyl hydrazide, and p,p'-oxybis (benzenesulfonyl hydrazide). Additional gas generating agents which can be utilized include azodicarbonamide, and alkali metal salts of azodicarboxylic acid.

Although sodium hydrogen carbonate and other bicarbonate gas generating agents can be utilized, they are limited by an equilibrium which reduces yield with increasing pressure. To overcome this limitation, bicarbonate decomposition can be pH driven with formulations containing suitable compounds for pH depression with temperature increase. One such compound is the nitrogen releasing blowing agent, p-toluene sulfonyl hydrazide. Bicarbonate decomposition generates carbon dioxide. The addition of a suitable amount of p-toluene sulfonyl hydrazide, which liberates water soluble, acidic byproducts upon decomposition, causes substantially increased volumes of carbon dioxide to be released from solution due to bicarbonate decomposition.

DNPT, the gas generating agent utilized herein, is a yellowish powder which decomposes in air above 190°–200° C. to yield typically 230 cc gas at STP per gram. DNPT is very sensitive to decomposition in the presence of mineral acids. Acid catalyzed hydrolysis follows as shown:

$$C_5H_{10}(NO)_2N_4 + 3H_2O \rightarrow 5CH_2O + 2N_2 + 2NH_3$$

In buffered solutions, the rate constant was found to increase linearly with [H+] according to

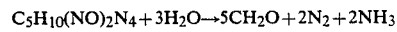

$$k = 6.0E-6 + 0.404[H+], T = 30° C.$$

This rate constant is disclosed by Hikoji Tada in the J. Am. Chem. Soc., Vol. 82, page 266 (1960). Thus, DNPT will decompose slowly even at room temperature.

The saline solution containing the gas generating agent, the surfactant, and the polymers are mixed and injected into a formation containing one zone of greater permeability and a zone of lesser permeability. Said solution predominantly enters the zone of greater permeability where a gel forms and nitrogen gas is generated. This reaction is accelerated by the formation temperature. As those skilled in the art will understand, the time within which a gel is formed and a gas is generated to make the foam depends on the chemical composition, the time the solution is in the formation, the temperature of the formation and catalytic effects of formation rock. Of course, pressures generated in the formation will limit the expansion of the foamable gel. As mentioned above, if the gelation is too rapid free radical retarders can be utilized. After about one hour to about 2 weeks, depending on formation variables and concentration of components utilized, a stiff foamed gel is generated in the more permeable zone of the formation. This stiff foamed gel thereby blocks pores in the more permeable zone of the formation. The composition of the foamed stiff gel can be similar to polystyrene in texture.

Once the foamed stiff gel has hardened to the extent desired, a water-flood or a $CO_2$ flood is commenced to remove hydrocarbonaceous fluids from the zone of lesser permeability. A waterflood process which can be utilized herein is disclosed in U.S. Pat. No. 4,658,898 which issued to Paul et al. A carbon dioxide process which can be utilized herein is disclosed in U.S. Pat. No. 4,513,821 which issued to W. R. Shu on Apr. 30, 1985. These patents are incorporated herein by reference. In order to show the beneficial results obtainable from the invention, the following tests were run.

TEST 1

A 100 g solution (volume ~100 ml) containing 10 wt.% acrylamide and 0.36% methylene-bis-acrylamide was placed in a calibrated 400 ml beaker. The brine used was 2 wt.% KCl buffered to pH=8.2, which is the pH used in the field for this gel. To this solution was added 2 g of DNPT and 1 g of sodium dodecyl benzene sulfonate. While this amount of DNPT is in excess of its solubility, it provides residual levels of DNPT in case DNPT decomposition should occur before the free radical polymerization. Then 0.1 g of sodium persulfate, a well-known free radical initiator, and 0.5 ml of triethanolamine, an activator, were added. The beaker was next heated on a hot plate. A foam layer appeared. For a long period of time, the top of the liquid layer was at the 90 ml mark and the foam level went to the 140 ml mark. About 42 minutes after heating was initiated, a large group of bubbles appeared, moved to the top of the "liquid" layer, and then stopped moving. At this point, the "liquid" level, which contained many bubbles, was at the 180 ml level. The "foam" expanded to the 240 ml level. There was only slight motion of the "liquid", which was a foamed gel. Heating was stopped at this point. The material continued to expand for about two weeks. The original 100 ml of solution expanded to a final volume of 400 ml with the foam uniform throughout. Thus, the residual DNPT was still decomposing even at room temperature. This is advantageous because syneresis or shrinkage is commonly observed in aqueous gel systems with aging. Residual quantities of blowing agent may reverse the effects of this trend. This foam has remained stable for seven months at room temperature. This test demonstrates that large expansion factors can be obtained from foamed gels.

TEST 2

A 100 g solution (volume ~100 ml) was made up of 10 wt.% acrylamide and 0.36 wt.% methylene-bis-acrylamide buffered at pH 8.2 in 2% KCl. This solution also contained 2 g of DNPT, 1 g of sodium dodecyl benzene sulfonate, 0.24 g of sodium persulfate, 0.1 ml of triethanol amine, and 10 mg of potassium ferricyanide, a retarder of free radical polymerizations. The solution was put in a capped pressure bottle and placed in a 165° F. oven equipped with a glass observation port. The ensuing gelation and foaming reactions were visually observed through the port and also recorded with a video camera. Slow decomposition of the DNPI started after five minutes. A small foam layer started to build between 17 and 20 minutes after the bottle was placed in the oven, but the build-up was not large. Gelation was rapid when it occurred, taking place between 25 and 27 minutes. Only after gelation did significant expansion occur. Four minutes after gelation, expansion was 30%. Maximum expansion of a factor of three occurred 20 minutes after gelation. The bottle has remained in the 165° F. oven for six months. There has been some contraction of the foam, but the expansion is still a factor of two. This test demonstrates: (1) that gelation can be controlled with a free radical retarder; (2) that it is crucial that sufficient foamant remain undecomposed after gelation to achieve maximum expansion factors; and (3) that foamed gels are stable at elevated temperatures if the polymer from which they are made is stable at those temperatures.

TEST 3

A 50 g solution (volume ~50 ml) was made up of 5 wt.% acrylamide and 0.24 wt.% methylene-bis-acrylamide in a 7% brine buffered to pH=8.2. The sample also contained 15 mg of sodium persulfate, 0.012 ml of triethanol amine, 1 g of DNPT, and 0.5 g of sodium dodecyl benzene sulfonate. The sample was poured into a bottle and placed in a 165° F. oven. The material gelled between 19 and 34 minutes after placement into the oven. A foam expansion factor of a factor of four was achieved 1 hour and 34 minutes after placement into the oven. After four hours the expansion factor was a factor of three which stayed constant. A few days later the bottle was taken out of the oven and left at room temperature. After five months the expansion factor is still three. This test shows that a 5% organic crosslinked polyacrylamide can be successfully foamed to give a stable foamed gel and that the procedure can be carried out in brines of high salinity.

TEST 4

A 50 g solution (volume ~50 ml) was made up of 0.2 wt.% Xanthan biopolymer, 80 ppm $Cr^{+3}$, 1g of DNPT, and 0.5 g of sodium dodecyl benzene sulfonate in a brine of 5.5% NaCl and 0.5% $CaCl_2$. The sample was put in a bottle which was placed in a 125° F. oven. The material gelled in approximately 20 minutes. A control ample without DNPT and sodium dodecylbenzene sulfonate gelled in approximately 60 minutes. The sample containing the foamant started to expand after gelation. After 24 hours the 50 ml had expanded to 125 ml. Of this 125 ml, ~40 ml was expelled as water at the bottom of the bottle, and the remaining 85 ml was foamed gel. This test demonstrates that these procedures can be generalized to foaming other common profile control gels.

Although $Cr^{+3}$ ions were utilized herein, as is known by those skilled in the art, other transitional metal ions can be added in an amount sufficient to form a Xanthan polymer gel by crosslinking. Suitable crosslinking polyvalent metal cations include $Al^{+3}$, $Cr^{+3}$, $Fe^{+3}$, $Sb^{+3}$ and $Zr^{+4}$.

TEST 5

A 5 wt.% acrylamide formulation in 2% KCl buffered to pH 8.2 was prepared comprising: 5 wt.% monomer, 0.24 wt.% methylene-bis-acrylamide, 0.12 wt.% sodium persulfate, 0.02 wt.% triethanol amine, 0.5 wt.% dodecyl benzene sulfonate, and 0.5 wt.% dinitrosopentamethylenetetramine. An 8 inch, 1.87 inch diameter vessel was filled with 3/0 Agsco quartz sand. 160.8 grams of the gellable solution was allowed to fill the vessel from the bottom by gravitational flow. 80 mesh screens were placed in an incubator-type oven at 65° C. and allowed to stand overnight. 34.5 grams of aqueous solution was displaced from the open end before gel material had formed a plug at the outlet. The cell was opened to inspect the contents. When internal pressure generated by gas release and confined by screen plugging was released, the now consolidated, foamed gel medium expanded by roughly 15%. The sand medium exhibited a tough, spongy, elastic character. This test demonstrates that simultaneous foaming and gelation can be conducted in an unconsolidated porous medium with 5% organic crosslinked polyacrylamide.

Thus, these five tests demonstrate the validity of our invention. These foam expansion factors of two to four mean that expensive profile control agents could be used in a reduced amount to give a comparable depth of treatment to that in the absence of foam. Of course, expansion factors will be reduced at the high pressures in the formation. Expansion factors will be best at shallow depths.

As demonstrated in the above tests, this novel foaming gel can be used to close off a more permeable zone in a formation during a gravity override situation where a $CO_2$ flood is employed.

The method of this invention can be utilized in a profile control or a gravity override situation where a water flood is employed. After completing a water flooding operation, the more permeable zone of a multi-zone formation will have substantially all hydrocarbonaceous fluids removed. Hydrocarbonaceous fluids still remain in the area of lesser permeability. This novel foamed gel can be used to effectively close a zone of greater permeability. Once the zone of greater permeability is closed, a water flood can be used to remove hydrocarbonaceous fluids from the zone of lesser permeability. Hurd discusses profile control in U.S. Pat. No. 4,458,760 which issued on July 10, 1984. This patent is hereby incorporated by reference.

In flooding operations, a liquid, usually water, is injected into the subterranean, oil-bearing formation through an injection well which extends from the surface of the earth down into the formation. A production well also extends into the formation at an offset or horizontal distance from the injection well so that, as the flooding liquid is injected into the formation through the injection well, it displaces the oil towards the production well, from which it may be recovered. Often, more than one injection well and more than one production well will be used in order to cover the oil field adequately and maximize recovery. Various arrangements of injection and production wells are used to this end, e.g., linear arrangements to form a line drive, five spot, inverted five spot, seven spot, inverted seven spot, all of which are established in conventional practice.

Utilization of this gel in a gravity override situation is depicted in the drawings. FIG. 1 shows a formation wherein a gravity override situation has been created. As shown in FIG. 1, injection well 10 penetrates a hydrocarbonaceous fluid bearing formation containing unswept zone 18 and swept zone 20 thereby creating a $CO_2$ override or bypass situation. $CO_2$ enters injection well 10 via line 14 and proceeds into swept zone 20 by perforations 22 in injection well 10.

$CO_2$ mixes with hydrocarbonaceous fluids in swept zone 20. Resultant hydrocarbonaceous fluids from zone 20 are combined with $CO_2$ and exit zone 20 via perforations 26 into production well 12 into line 16 where said fluids and steam are subsequently separated and recovered.

Once recovery of hydrocarbonaceous fluids from swept zone 20 has been terminated, the foamable gel is injected into injection well 10 via line 14. Said gellable fluid enters swept zone 20 via perforations 22. In one embodiment, heat from the formation causes nitrogen to be released thereby forming a foamed gel. A substantially stiff gel is formed of a size or nature sufficient to plug pores in swept zone 20. Behavior of unfoamed gels in permeable zones of a formation is also discussed in U.S. Pat. No. 3,908,760 issued to Clampitt et al. on Sept. 30, 1975. This patent is hereby incorporated by reference.

Figure 2:
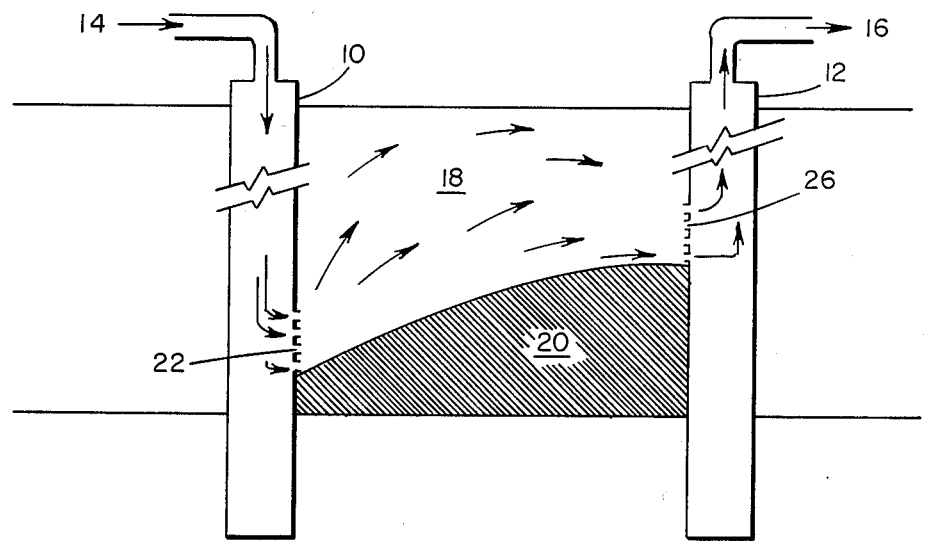
FIG. 2 is a schematic illustration where the gas flood swept zone has been closed by the foamed gel and hydrocarbonaceous fluids are removed from a previously unswept zone.

After the foamed gel has stiffened, $CO_2$ is injected into injection well 10 via line 14 where via perforations 22 it enters bypassed zone 18 which contains hydrocarbonaceous fluids. This process is shown in FIG. 2. $CO_2$ mixes with said fluids in unswept zone 18. Said fluids and $CO_2$ are then removed from zone 20 via perforations 26 into production well 12. Here, said fluids and $CO_2$ are removed from production well 12 via line 16. After exiting line 16, said fluids and $CO_2$ are separated and recovered. Recovered $CO_2$ can be recycled into said formation to recover additional hydrocarbonaceous fluids.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for in-situ foaming of a gel useful for profile control comprising:
   (a) injecting into a more permeable zone of a formation an aqueous saline solution which solution contains a gas generating agent, a surfactant, and a gellable polymer in an amount sufficient to make a foamable gel; and
   (b) allowing said solution to remain in said more permeable zone for a time sufficient and under formation temperatures sufficient to cause said gas generating agent and surfactant to create a foam thereby foaming a gel resultant from said gellable polymer which gelled foam expands and stiffens sufficiently to close pores in said more permeable zone 2. The method as recited in claim 1 where said gellable polymer comprises polyacrylamide/methylene-bis-acrylamide or a Xanthan bipolymer crosslinked with transitional metal ions.

3. The method as recited in claim 1 where said saline solution is formation brine water, sea water, brackish water, or has a salt concentration of up to about 25% by weight.

4. The method as recited in claim 1 where polyacrylamide polymer is contained in said solution in an amount of from about 3.0% to about 15% by weight and methylene-bis-acrylamide polymer in said solution is from about 0.04% to about 4% by weight.

5. The method as recited in claim 1 where an initiator is utilized which is a member selected from the group consisting of sodium persulfate, t-butylhydroperoxide, cumyl hydroperoxide, a peroxide or other azo compound which decomposes at reservoir temperatures.

6. The method as recited in claim 1 where said gas generating agent is a member selected from the group consisting of dinitrosopentamethylene-tetramine, sodium hydrogen carbonate, p-toluene sulfonyl hydrazide, p'p'-oxybis (benzenesulfonyl hydrazide), azodicarbonamide, and alkali metal salts of dicarboxylic acid.

7. The method as recited in claim 1 where said surfactant is a member selected from the group consisting of sodium dodecylbenzene sulfonate, sulfonate-sulfate surfactant mixtures, Petronates, i.e., salts of petroleum sulfonic acids, Pyronate fatty acid and tall oil acid soaps, and nonionic surfactants.

8. The method as recited in claim 1 where said solution contains a formation temperature dependent free radical initiator in an amount sufficient to either initiate or accelerate decomposition of said polymer.

9. The method as recited in claim 1 where said foamed gel forms in about one week and retains its integrity.

10. The method as recited in claim 1 where either a water-flood or a $CO_2$ flood is initiated after step (b) thereby removing hydrocarbonaceous fluids from a zone of lesser permeability.

11. The method as recited in claim 1 where gas liberation and crosslinking occurs simultaneously.

12. The method as recited in claim 1 where said gas generating agent is dinitrosopentamethylenetetramine contained in a sufficient amount for a single phase injection fluid.

13. The method as recited in claim 1 where said gas generating agent is dinitrosopentamethylenetetramine contained in an excess amount in said solution to be injected as a stable dispersion.

14. The method as recited in claim 1 where the saline solution has a pH of about 8.

15. A method for in-situ foaming of a gel useful for profile control comprising:
(a) injecting into a more permeable zone of a formation an aqueous saline solution which solution contains an in-situ gas generating agent which comprises dinitrosopentamethylenetetramine, sodium hydrogen carbonate alkali metal salts of dicarboxylic acid and mixtures thereof,
 (i) a surfactant,
 (ii) and a gellable polymer comprising a polyacrylamide/methylene-bis-acrylamide or a Xanthan bipolymer crosslinked with transitional metal ions in an amount sufficient to make a foamable gel; and
(b) allowing said solution to remain in said more permeable zone for a time sufficient and under formation temperatures sufficient to cause said foaming agent and surfactant to create a foam thereby foaming a gel resultant from said gellable polymer which gelled foam expands and stiffens sufficiently to close pores in said more permeable zone.

16. The method as recited in claim 15 where said saline solution is formation brine water, sea water, brackish water, or has a salt concentration of up to about 25% by weight.

17. The method as recited in claim 15 where polyacrylamide polymer is contained in said solution in an amount of from about 3.0% to about 15.0% by weight and methylene-bis-acrylamide polymer in said solution is from about 0.04% to about 4% by weight.

18. The method as recited in claim 15 where an initiator is utilized which is a member selected from the group consisting of sodium persulfate, t-butylhydroperoxide, cumyl hydroperoxide, a peroxide or other azo compound which decomposes at reservoir temperatures.

19. The method as recited in claim 15 where said surfactant is a member selected from the group consisting of sodium dodecylbenzene sulfonate, sulfonate-sulfate surfactant mixtures, Petronates, i.e., salts of petroleum sulfonic acids, Pyronate fatty acid and tall oil acid soaps, and nonionic surfactants.

20. The method as recited in claim 15 where said solution contains a formation temperature dependent free radical initiator in an amount sufficient to either initiate or accelerate decomposition of said polymer.

21. The method as recited in claim 15 where said foamed gel forms in about one week and retains its integrity.

22. The method as recited in claim 15 where either a water-flood or a $CO_2$ flood is initiated after step (b) thereby removing hydrocarbonaceous fluids from a zone of lesser permeability.

23. The method as recited in claim 15 where gas liberation and crosslinking occurs simultaneously.

24. The method as recited in claim 15 where said foaming agent is dinitrosopentamethylenetetramine contained in a sufficient amount for a single phase injection fluid.

25. The method as recited in claim 15 where said foaming agent is dinitrosopentamethylenetetramine contained in an excess amount in said solution to be injected as a stable dispersion.

26. The method as recited in claim 15 where the saline solution has a pH of about 8.

27. A method for in-situ foaming of a gel useful for profile control comprising:
(a) injecting into a more permeable zone of a formation an aqueous saline solution having a pH of about 8 which solution contains an in-situ gas generating agent which comprises dinitrosopentamethylenetetramine,
 (i) a surfactant,
 (ii) and a gellable polymer comprising a polyacrylamide/methylene-bis-acrylamide or a Xanthan biopolymer crosslinked with transitional metal ions in an amount sufficient to make a foamable gel; and
(b) allowing said solution to remain in said more permeable zone for a time sufficient and under formation temperatures sufficient to cause said foaming agent and surfactant to create a foam thereby foaming a gel resultant from said gellable polymer which gelled foam expands and stiffens sufficiently to close pores in said more permeable zone.

28. The method as recited in claim 27 where an initiator is utilized which is a member selected from the group consisting of sodium persulfate, t-butylhydroperoxide, cumyl hydroperoxide, a peroxide or other azo compound which decomposes at reservoir temperatures.

29. The method as recited in claim 27 where said surfactant is a member selected from the group consisting of sodium dodecylbenzene sulfonate, sulfonate-sulfate surfactant mixtures, Petronates i.e. salts of petroleum sulfonic acids, Pyronate fatty acid and tall oil acid soaps, and nonionic surfactants.

30. The method as recited in claim 27 where said solution contains a formation temperature dependent free radical initiator in an amount sufficient to either initiate or accelerate decomposition of said polymer.

31. The method as recited in claim 27 where either a water-flood or a $CO_2$ flood is initiated after step b) thereby removing hydrocarbonaceous fluids from a zone of lesser permeability.

* * * * *

UNITED STATES PATENT AND TRADEMARK OFFICE
CERTIFICATE OF CORRECTION

PATENT NO. : 4,844,163

DATED : July 4, 1989

INVENTOR(S) : Randy D. Hazlett et al.

It is certified that error appears in the above-identified patent and that said Letters Patent is hereby corrected as shown below:

Column 4, line 17, "Iriton" should read --Triton--.

Column 4, line 23, "foaming" should read --gas generating--.

Column 6, line 8, "DNPI" should read --DNPT--.

Column 9, line 53, after "carbonate" insert a comma (,).

Signed and Sealed this

Eleventh Day of December, 1990

Attest:

HARRY F. MANBECK, JR.

*Attesting Officer*     *Commissioner of Patents and Trademarks*